Nov. 29, 1932.  E. E. HEWITT  1,889,122
CHECK VALVE DEVICE
Filed Nov. 24, 1930
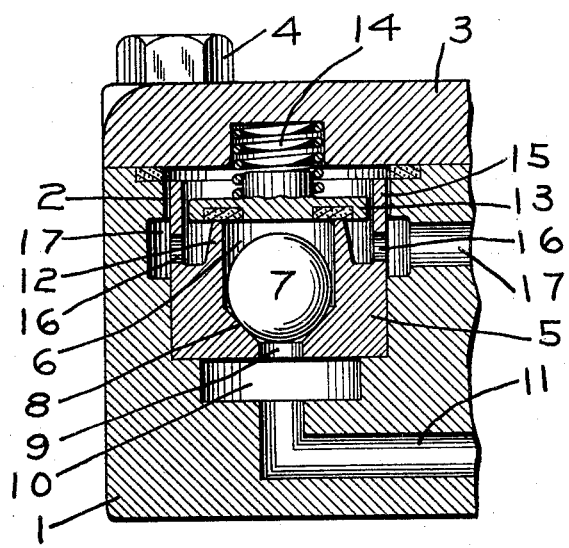
INVENTOR.
ELLIS E. HEWITT
BY Wm. M. Cady
ATTORNEY.

Patented Nov. 29, 1932

1,889,122

UNITED STATES PATENT OFFICE

ELLIS E. HEWITT, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

CHECK VALVE DEVICE

Application filed November 24, 1930. Serial No. 497,724.

This invention relates to check valve construction and more particularly to that type in which a plurality of check valves are employed which are arranged in series.

The principal object of my invention is to provide an improved check valve construction of the above type which will be very compact, easily assembled and disassembled and easily and cheaply manufactured.

Other objects and advantages will appear in the following more detailed description of the invention.

In the accompanying drawing, the single figure is a sectional view through a portion of a casing having my improved check valve construction embodied therein.

In the drawing, the reference character 1 indicates a portion of the casing of any part or device of a fluid pressure equipment, said casing having a recess 2 formed therein which is open at one end. The open end of this recess is adapted to be closed by a cover plate 3 which may be removably secured to the casing by stud bolts 4, only one of which is shown.

Contained in the recess 2 and having leak proof engagement with the casing 1 is a valve seat member 5 having a recess 6 in which is contained a ball check valve 7 which is adapted to seat on a valve seat surface 8 on the member to close communication from the recess 6 to a fluid pressure supply chamber 10 and supply passage 11 by way of a passage 9 in the member.

The valve seat member 5 is also provided with an annular seat rib 12 upon which a disc check valve 13 is adapted to seat, said seat rib defining the upper end of the recess 6. Interposed between and engaging an inner surface of the cover plate 3 and the back of the check valve 13 is a coil spring 14, the pressure of which tends to urge the valve to its seat.

The valve seat member 5 is further provided with an annular guide portion 15 which surrounds the seat rib 12 and check valve 13 and is for the purpose of preventing excessive transverse movement of the check valve 13. This guide portion is provided with openings 16 through which fluid is adapted to flow to an outlet passage 17 in the casing.

From the foregoing description, it will be noted that in my improved check valve construction there is a single valve seat member mounted in a single recess in a casing which has two valve seats for two check valves arranged in series, the check valve 7 being preferably in the form of a ball and being adapted to be seated by the force of gravity, and the check valve 13 being preferably in the form of a disc which is adapted to be seated by the force of a spring.

In assembling the check valve construction the valve seat member is first inserted in the recess 2 and then pressed to its proper position in the casing. After the seat member is thus positioned, the ball check valve 7 is placed in the recess 6 after which the disc valve 13 is inserted in the guide portion 15, and the spring 14 is mounted on the back of the valve 13. Finally, the cover plate 3 is secured in place on the casing.

In an application of Clyde C. Farmer, filed July 24, 1930, and serially numbered 470,292, a check valve construction is disclosed and claimed, in which a plurality of check valves are arranged in series in a single check valve receiving recess, and in view of this, the appended claims are limited to certain novel features not disclosed in the Farmer application.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a check valve construction, the combination with a casing having a single check valve receiving recess open to an inlet and an outlet passage, of a single valve seat member carried by said casing within said recess, an annular seat rib on said member, a valve seat formed on said member below said seat rib, a disc check valve adapted to seat on said seat rib, an annular sleeve surrounding said seat rib and the periphery of said disc valve and forming a guide for said valve for the full travel of the valve, and a ball check valve adapted to seat on said valve seat, said check valves when seated closing communication from the outlet passage to the inlet passage.

2. In a check valve construction, the combination with a casing having a single check valve receiving recess open to an inlet and an outlet passage, of a single valve seat member carried by said casing within said recess, an annular seat rib on said member, a valve seat formed on said member below said seat rib, a disc check valve adapted to seat on said seat rib, an annular sleeve surrounding said seat rib and the periphery of said disc valve and forming a guide for said valve for the full travel of the valve, said sleeve having outlet passages arranged below said disc valve and open to said outlet passage, and a ball check valve adapted to seat on said valve seat, said disc check valve and ball check valve when seated closing communication from the outlet passages in the guide sleeve and the inlet passage.

In testimony whereof I have hereunto set my hand, this 20th day of November, 1930.

ELLIS E. HEWITT.